INVENTORS
THEODORE S. BRISKIN
ROBERT L. MOORE
RUDOLPH A. ROM
BY Lawrence I. Field
ATTORNEY Feb. 5, 1963 T. S. BRISKIN ETAL 3,076,397
AUTOMATIC CAMERA
Filed Feb. 10, 1959 3 Sheets-Sheet 3
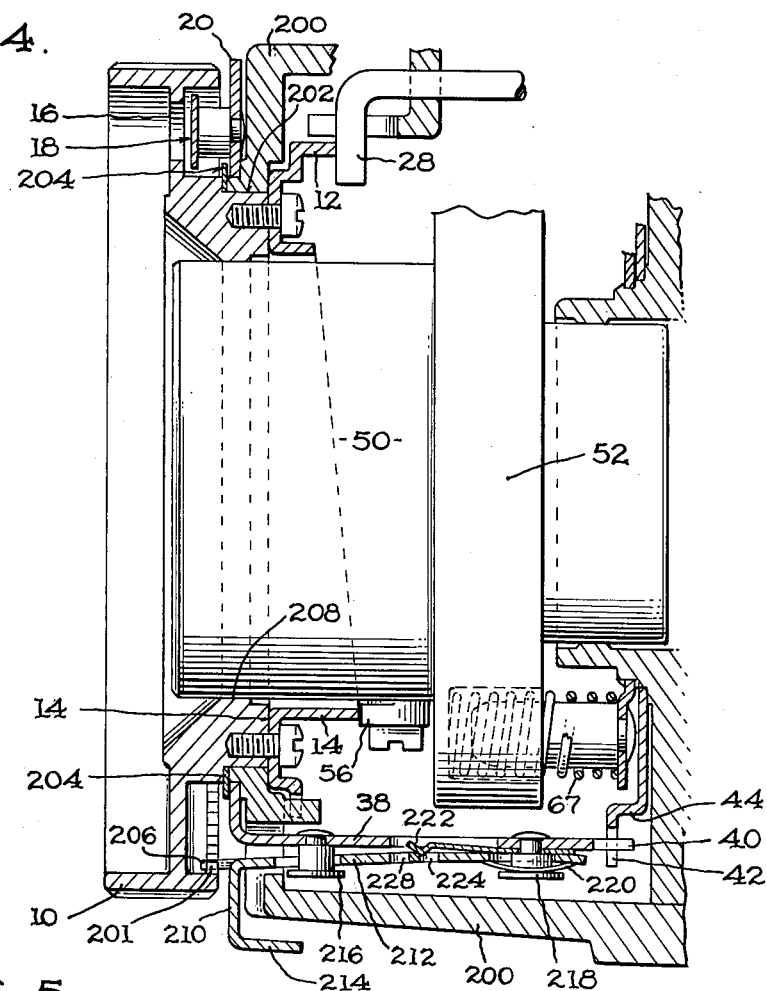
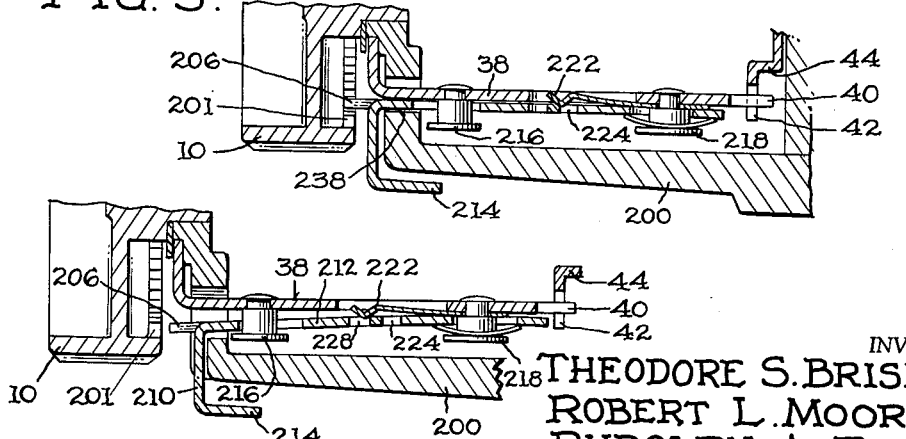
INVENTORS
THEODORE S. BRISKIN
ROBERT L. MOORE
RUDOLPH A. ROM
BY Lawrence J. Field
ATTORNEY 000# United States Patent Office 3,076,397
Patented Feb. 5, 1963

3,076,397
AUTOMATIC CAMERA
Theodore S. Briskin, Chicago, Robert L. Moore, La Grange, and Rudolph A. Rom, Berwyn, Ill., assignors to Revere Camera Company, a corporation of Delaware
Filed Feb. 10, 1959, Ser. No. 792,421
1 Claim. (Cl. 95—64)

This invention relates to an improved photographic camera. More particularly it relates to a camera adapted to take pictures of subjects which are illuminated by either natural or artificial light and which may be operated as a fully automatic camera, or as semi-automatic or entirely manually, according to the mode of operation selected by the photographer.

Interest in the use of light sensitive cells to actuate means for varying the diaphragm aperture in cameras has been recently revived because of the emergence of light sensitive materials of greater efficiency than those which have heretofore been available commercially. Cameras in which a light sensitive cell is used in this manner are known.

The known prior art includes cameras in which the focusing rings and diaphragm rings are interconnected mechanically by links or other complicated mechanical means.

Still other cameras are known in which means are provided to permit photographers to take pictures under artificial illumination (e.g. flash or flood-lights or the like) while merely focusing the camera, after it has been previously set for a particular combination of film, shutter speed and illumination (e.g. as taught in Parody 2,549,230). As is well understood, such means cannot be operated in conjunction with the light sensitive cell exposure controls above-mentioned with instantaneous illumination such as that provided by "flash" or "strobe" lights because the response of the diaphragm mechanism responsive to the light sensitive cell is entirely too slow and hence the instantaneous illumination produces overexposed pictures.

By the present invention a camera has been provided in which the desirable features of an automatic flash camera are retained in combination with the advantages of light sensitive cell control for pictures taken under natural illumination and in which a simplified lens mount permits ease of operation with either artificial or natural illumination.

One object of the present invention is to provide a simpler and more accurately controlled means for selectively operating a camera, than those previously employed.

Another object is to provide means integral with the camera for effecting the desired simplification of adjustments to be performed by the photographer.

A further object of the invention is to provide a photographic apparatus in which the camera may be preset for any combination of shutter speed, type of film and type of illumination to be used in the camera and in which the diaphragm opening may be automatically adjusted when the camera is brought into focus on the subject without impairing the ability of the camera to be operated at other times also as a light sensitive cell-controlled camera.

Still another object of the invention is to provide a simple and rugged camera wherein, in order to take pictures under natural illumination, the photographer is required to merely focus the camera and expose the film, without undue delay incident to making a number of adjustments.

Still another object of the invention is to provide an improved means for communicating to the photographer the exposure set by the light sensitive cell and to provide an improved means for correcting erroneous exposures inherently produced under certain conditions, when the exposure is determined solely by the light sensitive cell.

Still another object of the invention is to provide a camera with a combined range finder-view finder in which a projected frame line and a projected meter scale are both visible in the view finder as the subject is being photographed.

A further object is to provide a camera which may be operated as a flash camera, or a photocell controlled camera or a manually operated camera, at the option of the photographer.

These and other objects will become apparent from the following description and drawings in which there is shown a preferred embodiment of the invention, for purposes of illustration and not by way of limitation and in which:

FIGURE 1(a) is a diagrammatic view showing the relative position of the optical axes of FIGURE 1.

Figure 1:
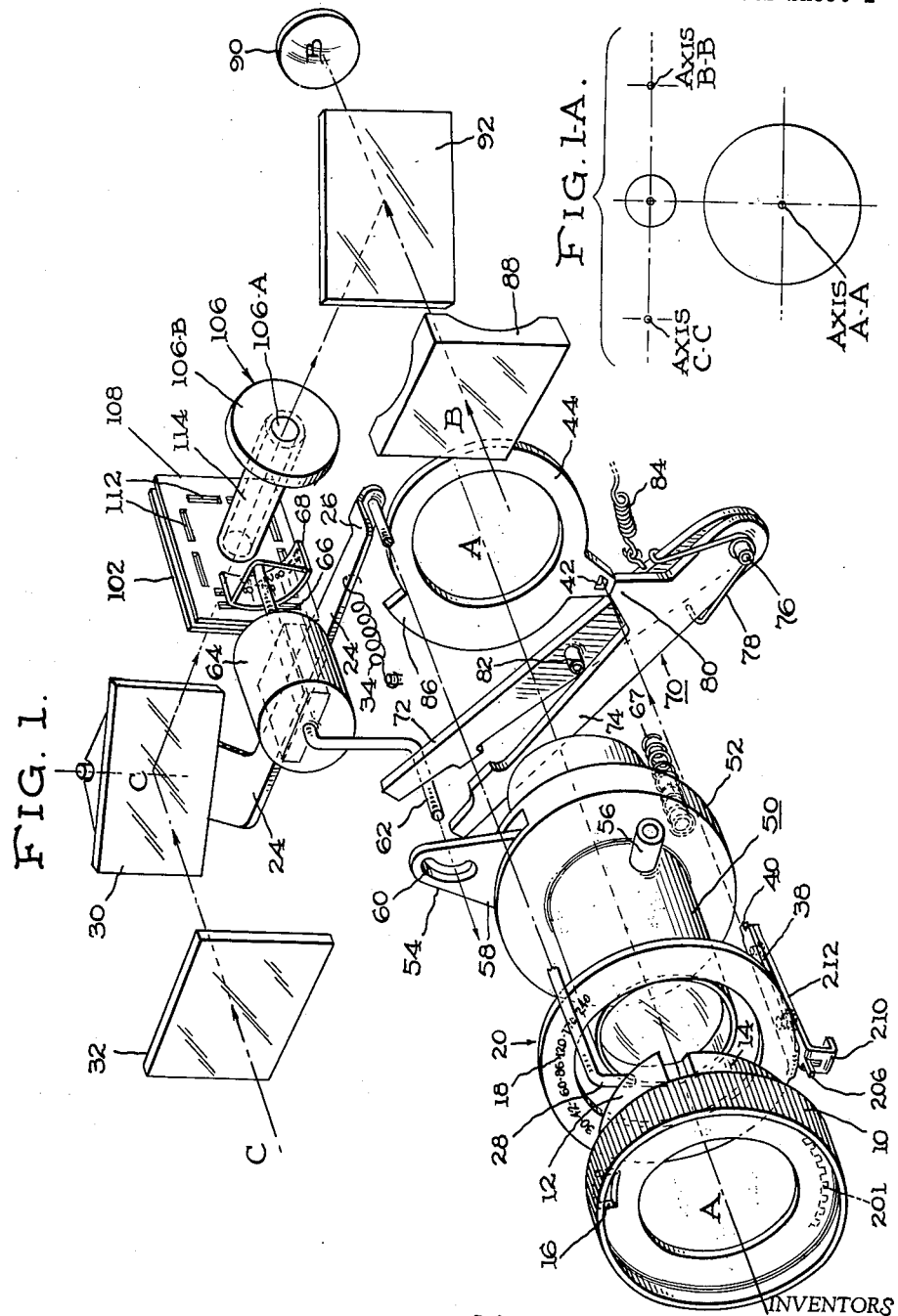
FIGURE 1 is an exploded schematic view of a camera adapted to be employed selectively as an automatic flash camera or as a photocell controlled automatic camera or as a manually operated camera, in accordance with the present invention.

FIGURES 4, 5 and 6 are fragmentary views taken partly in section of the assembled forward portion of a preferred camera of the type shown schematically in exploded form in FIGURE 1. FIGURE 4 shows a portion of the mechanism in position for taking flash pictures, FIGURE 5 shows the change in position of a portion of that mechanism for taking pictures with the exposure controlled by a light responsive photocell and FIGURE 6 illustrates the mechanism when it has been set for manual operation of the camera.

The camera shown in the several figures may be operated in any of three ways, and it will be readily appreciated that much of the mechanism is common to all three. In the description which follows, this structure is described first and thereafter, the particular portion of the mechanism necessary to each method of operation is presented in appropriately titled sections.

Beginning at the forward side of the camera shown in the exploded view of FIGURE 1 there is a focus ring 10 which carries a range-finder cam 12 and a focus cam 14. Both of these cams are designed so that equal increments of angular movement of the focus ring 10 cause the range finder and the lens to change focus an amount based on the square root of twice the square of the distance. An aperture 16 is formed extending through the focus ring to provide visual access to a scale 18 carried on a diaphragm ring 20. The focus ring contains series of detent ears 201 adapted to be engaged by an ear 206 in certain positions of operation of the camera, as will be described below.

Range finder 24 comprises a bracket arm portion 26 which terminates in a cam follower 28 which is constantly urged against the cam surface of range finder cam 12. Range finder bracket arm is pivotly mounted and carries a mirror 30 positioned to receive and reflect light falling on its surface, after passing through a window 32 located on an upper portion of the front surface of the camera housing. A spring 34, one end of which is secured to the frame of the camera, serves to urge the range finder bracket arm 26, and in turn the cam follower 28 into firm contact with the surface of range finder cam 12, free from backlash throughout rotation of focus ring 10. Window 16 in the focus ring 10 is positioned so that it cooperates with a guide number scale 18 on the forward face of the diaphragm ring 20.

The diaphragm ring 20 is a flat disc, provided with scale 18 showing guide numbers on its forward face. A locked orientation of focus ring 10 relative to diaphragm ring 20 may be established by means of a retractable pin 206 which engages detent ears 201. An arm 38 extending rearwardly from the diaphragm ring, terminates in a tip 40 having a reduced cross sectional area, which is adapted to be seated in a recess 42 in an extension of a diaphragm control cam plate 44.

A cylindrical lens mount indicated generally as 50 is mounted in the camera housing 200 as seen more clearly in FIGURE 4, which includes a section taken through camera body in the plane of the central axis of the lens mount. In an enlarged portion 52 of the lens mount, one or more diaphragm members 54 is supported for movement whereby the diaphragm opening may be enlarged or diminished, in a manner well known in the art. A focus cam follower 56 is supported on the lens mount 50 so that it may follow the path of focus cam 14 when focus ring 10 is rotated to focus the camera. In the device shown, one or more diaphragm members 54 carry an upwardly extending ear 58 provided with a cutout portion 60 in which a diaphragm actuating pin 62 is received.

AUTOMATIC OPERATION

In fully-automatic operation, pin 62 may be driven by a galvanometer 64 which in turn is actuated by a light sensitive cell (shown in FIG. 2) in a manner now well known in this art or it may be driven by other operator controlled means (hereinafter explained). A spring 67 is mounted to urge the lens mount 50 and particularly the focus cam follower carried thereon into constant engagement with the focus cam 14, thereby eliminating backlash in this portion of the mechanism.

As shown in FIGURE 1, means are provided for operating the camera so that the diaphragm opening is varied automatically in response to the illumination received by a light-sensitive cell operating the galvanometer 64, and diaphragm actuating pin 62 is directly connected to the diaphragm 54 through the slot 60 to drive the diaphragm and to adjust it in the desired manner, it being understood that galvanometer drives pin 62 in response to the amount of illumination falling on the light sensitive cell.

The light sensitive cell 94 (see FIGURE 2) is electrically connected by leads 96 and 98 to the spring biased galvanometer 64 and drives the galvanometer, according to the light received by the photocell. Operatively connected to the galvanometer by a stub shaft 66 is a scale 68 bearing indicia corresponding to the diaphragm openings. As shown, the scale is preferably carried by shaft 66 which is rotatable with the galvanometer coil. Scale 68 is illuminated by light passing through window 110 as will be more fully described below.

In FIGURE 5 the mechanism shown in FIGURE 1 is now depicted in the position it occupies when the photographer desires to operate the camera under the control imposed by a photocell or other automatic light responsive means. In this figure, tip 214 has been pressed up against the camera and rotated to automatic position where a shelf portion 238 of the camera body supports arm 210 so that extension 206 is entirely disengaged from the slots 201 in the focus ring 10.

MANUAL OPERATION

Means are also shown in the exploded view of FIGURE 1 for operating the camera manually. In the device shown, means 70 are provided for over-riding the light-sensitive cell driving means without disconnecting said means. Said over-riding means 70 comprise two cooperating pivoted jaws 72 and 74 each of which is mounted on a pivot 76 and which have, on their opposed faces, ears defining a slot. Jaw 74 which constitutes the override arm is biased toward jaw 72 by means of a spring 78. Adjacent the pivoted end of jaw 74 is an enlarged portion 80 adapted to hold jaw 74 open in automatic position. Jaw 72 which constitutes the diaphragm control arm also serves as the support for a diaphragm cam follower 82. Jaw 72 is biased by a spring 84 toward the cam surface 86 of diaphragm control cam plate 44. For manual operation diaphragm control cam plate 44 is rotated counterclockwise a small amount from its position as illustrated in FIGURE 1. This allows jaw 74 to move towards jaw 72 until the ears 76 come in contact with each other causing the jaws to form a slot with diaphragm actuating pin 62 imprisoned and held firmly within this slot.

The means for controlling the diaphragm opening when the jaws have been brought into contact with pin 62 consists of diaphragm adjusting ring 20, extension 38, tip 40 and diaphragm control cam 44. Manual rotation of finger 214 by the operator, to the position shown in FIG. 6 effects rotation of the diaphragm cam 44 which in turn actuates cam follower 82 and causes the slot formed by jaws 72 and 74 to move. As a result the imprisoned diaphragm actuating pin is caused to move, actuating the diaphragm. It will thus be seen that there has been provided a mechanical means for overriding the diaphragm adjustment automatically imposed by the photocell, without the necessity for disconnecting the photocell or for disturbing it in any way.

The position shown in FIGURE 6 corresponds to that of FIGURE 4 except that finger 214 has been depressed and arm 210 has been moved rearward so that the bent portion of detent spring engages opening 228 and tip 206 is out of engagement with slots 201. In this position both the focus ring and the diaphragm ring are free to rotate and are independent of each other.

FLASH OPERATION

As is well known in the art, in making photo flash exposures, the illumination of the object to be photographed depends upon the power of the photoflash bulb used and the distance of the subject from the source of light. Usually the artificial light is attached to the camera by a light bar or is otherwise located near the camera and the amount of light reflected by the subject will vary in accordance with the distance the light source is spaced from the subject. In the present device, about to be described, means are provided for maintaining the desired relationship between the lens focusing and lens adjusting means, for flash operation, by virtue of the focus cam 14 shaped to maintain this relationship.

To maintain the quantity of light reflected by the object and passing through the main lens system substantially constant, it is necessary that the diaphragm be varied on a basis of a scale based on the square root of twice the square of the distance from the camera to the subject and this is exactly what cam 14 accomplishes.

Means are provided for setting the camera to adapt it to operate as a flash camera. In the figure, these means comprise a finger 210 and mechanism associated therewith.

Finger 210 is a generally flat member 212 having an upstruck tab portion 214 adapted to extend to the outside of the camera housing, between the focus ring 10 and the camera frame 200, whereby it is readily accessible to be operated by the photographer and having a forwardly extending portion 206 adapted to be inserted between detent ears 201 provided in the lower portion of the focus ring. The main body portion of finger 210 is provided with two or more slots adapted to receive studs or other suitable means whereby it may be secured to arm 38 in a manner permitting it to be moved toward or away from arm 38 as well as towards the front or rear of the camera, for a limited amount of travel. Stud 216 secures the forward portion of arm 210 to arm 38 and stud 218 secures the rearmost portion of arms 210 and 38 to one another. A spring washer 220 placed between the head of stud 218 and finger 210 tends to maintain the rearmost portions in contact with one another.

Stud 218 also serves as means for supporting one end of a detent spring 222 positioned between the arms so as to urge their forward portions apart, and hence to urge the terminal portion 214 of finger 210 outwardly of the camera. Detent spring 222 terminates in a bent portion and two openings 224 and 228 are provided in arm 210 to receive the bent portion of the detent spring while maintaining finger 210 in a semi-rigid position, once the operator has actuated it so as to dispose the bent portion of the spring in one or the other of the arms. When the camera is to be operated as a flash camera, photographer depresses tip 214 and urges it forward so that when he releases tip 214, the bent portion of the detent spring is in the rearmost hole 224 and so that extension 206 will be urged into the slots provided in the focus ring to receive said extension 206.

RANGE FINDER-VIEW FINDER

Figure 2:
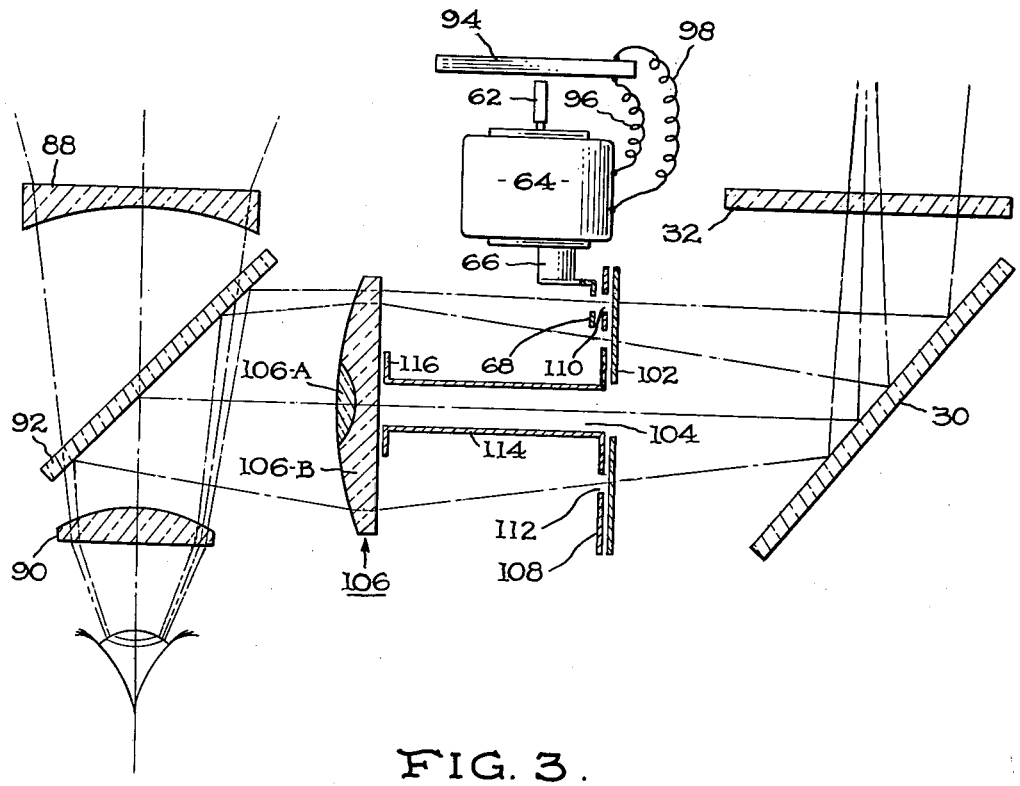
FIGURE 2 is a top view diagrammatically showing certain features of the optical system of the view-finder range finder of the camera of FIGURE 1.

A portion of the range-view finder optical system is schematically shown in the upper right hand region of FIGURE 1 and in greater detail in FIGURE 2. The view-finder portion of the optical system includes an objective lens 88 and an eyepiece lens 90. Positioned between the two lenses is a beam splitter 92 which is a semi-transparent reflector which permits approximately 50% of the light entering the objective lens 88 to pass through to form the image 100 shown diagrammatically in FIG. 3.

Figure 3:
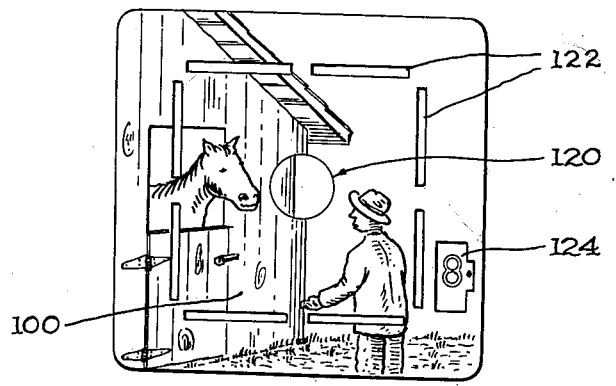
FIGURE 3 depicts the image seen by the photographer using the combined view finder-range finder of the camera of FIGURES 1 and 2.

Additional means shown in FIGURES 1 and 2 are provided whereby the photographer is enabled to see the image depicted in FIGURE 3. These means include window 32 through which light from the subject passes into the camera where it falls on range finder mirror 30 which reflects it towards a diffusing screen 102. The diffusing screen is formed as a flat rectangular member having a centrally located aperture through which a portion of the light reflected by mirror 30 may pass directly to a compound lens 106. Located alongside of the diffusing screen is an opaque masking member 108, substantially coextensive with the diffusing screen and having a central opening 104 corresponding to that in the diffusing screen. The opaque mask is pierced by additional openings 110 and 112. Window 110 is provided to pass light onto the scale 68 to illuminate same sufficiently for it to be rendered visible to the photographer. Openings 112 are provided to pass light through the opaque mask in a pattern which the photographer sees as a bright line frame 122 (see FIGURE 3).

Extending perpendicular to the plane of the opaque mask and coextensive with the central opening 104 in the mask is a shield tube 114 through which a portion of the light reflected by mirror 30 passes without interference from light passing through the windows in the opaque mask. The shield tube terminates in an annular flange 116 which is provided to prevent intermixing of the light passing lengthwise and within the shield tube and the light passing lengthwise but outside the confines of the tube 114, to compound lens 106.

Lens 106 is a coaxial compound lens with a central portion 106–A and an outer annular portion 106–B. Lens 106–A has approximately the same center thickness and focal length as objective lens 88.

The optical system described functions as follows to produce the image 100 of FIGURE 3. Light from the subject being photographed enters the camera through the main lens system housed in the lens mount 50 and forms an image on the film plane. Other light from the subject also enters objective lens 88 and thence to the beam splitter 92 positioned between the eyepiece lens 90 and the objective lens 88. About half of the light passes through the beam splitter 92 and forms the image 100 seen by the photographer.

Light from the subject being photographed entering the camera through window 32 is reflected by the range-finder mirror 30 towards the diffusing screen 102.

The light from the central portion of the subject passes through a central opening in screen 102, and is transmitted through shield tube to lens 106–A along an unobstructed path. About one-half of the light passing through lens 106–A is reflected by beam splitter 92 towards the eyepiece lens 90, forming the range image 120 superimposed on the view finder image 100.

The peripheral portion of the light entering the camera through window 32 falls on diffusing screen 102. That portion which passes through scale window 110 and reticle slots 112 in the opaque member adjacent the diffusing screen produces both the projected bright line image 122 and the image 124 of a portion of scale 68 seen in FIGURE 3.

The light passing through scale window 110 illuminates scale 68. The photographer sees the illuminated portion of scale 68 by means of eyepiece lens 90, beam splitter 92, and lens 106–B. Scale 68 is located in close proximity to scale window 110 and is therefore in substantially the same focal plane as the reticle slots 112 and hence both appear in focus as images 122 and 124 superimposed on the view-finder image 100.

The lenses of the projected image system are preferably designed in order that the projected images of the bright line frame and the $f$ value scale, images 122 and 124, appear to be suspended in space, some distance in front of the camera. This permits the photographer to comfortably and accurately frame his picture and at the same time to read the "$f$" value scale.

As best seen in FIGURE 3 the combined improved view finder includes a broken bright line 122 which is illuminated by light from the field of photographic interest, falling on mirror 30 and reflected by the mirror to a diffusing screen and then through openings in a reticle, thence through lens 106–B, projecting the bright line frame onto the field of the view finder. It also provides a range finder image 120, whereby the photographer is enabled to focus the camera without removing his eye from the eyepiece and, it further includes a projection of the "$f$" scale within the border of the view finder, outside of the bright line frame.

FIGURE 4 is a view partly in section of the nose portion of the camera, showing in their assembled position, the parts shown in the exploded schematic view of FIGURE 1.

Beginning at the front of the camera, there is a focus ring 10, mounted to rotate freely in an opening 202 in the body 200 of the camera. Secured to the rear of focus ring 10 are a range finder cam 12 and a focus cam 14, adapted to bear respectively against the terminal portion 28 of the range finder cam follower and the focus cam follower 56. Detent ears 201 are provided in the lower portion of the focus ring to cooperate with locating means to be described. A window 16 in the upper portion of the focus ring is disposed in alignment with guide number scale 18 supported on a forward extension of a diaphragm ring 20.

The diaphragm ring is rotatably mounted on a forwardly extending portion of the camera body 200 and is held in place by a spacer washer 204. Diaphragm ring 20 carries an extension 38 at its lower end. Arm 38 has a terminal portion 40 engaged in a slot 42 of diaphragm cam plate 44 which is mounted for rotation about a forwardly extending collar of the camera body.

The bore 208 of focus ring 10 is adapted to receive the forward portion of lens mount 50, the rear portion of which is seated in a cooperating recess in the camera frame. Spring 67 is mounted to urge the lens mount 50 and cam follower 56 which is secured to the lens mount, into engagement with the cam surface of focus cam 14 at all times.

OPERATION

(a) Automatic

To operate under the control of the light sensitive cell, the photographer loads his camera with a specific film, sets the A.S.A. film speed dial (not shown) permanently and also sets the shutter speed, if it is adjustable. He then depresses button 214 and rotates arm 210 so that tip 206 does not engage slots 201, and takes the position shown in FIGURE 5. To take a picture the photographer merely aims the camera and adjusts the focus, since the light sensitive cell controls the exposure by suitably enlarging or diminishing the diaphragm opening.

(b) Flashmatic

To take a flash picture with the device described, the photographer selects his flash bulb and film, and consults the film or bulb manufacturer's chart for the guide number, corresponding to the shutter speed he intends to employ. By depressing button 214 he disengages tip 206 and rotates either focus ring 10 or diaphragm ring 20 relative to the other until the desired guide number appears in the window 16. He then engages tip 206 into one of the apertures 201 in the focus ring. Thereafter, until tip 206 is disengaged by actuating button 214, the focusing ring and the diaphragm adjusting ring will remain correctly oriented relative to one another for the particular combination of the shutter speed, the type of film and the illumination for which the guide number corresponds. Now the only adjustment he is required to make, in order to take a picture, is to focus the camera; to do this he aims the camera at the subject, and manually rotates the focus ring until the subject is seen to be in focus in the view finder-range finder image of FIGURE 3. This is a simple operation which can be effected rapidly.

When the photographer focuses the camera, by rotation of the focusing ring, the following occur simultaneously and automatically as a result of his manual rotation.

(a) The focus is adjusted as the focus cam follower follows the contour of the focus cam; and (b) The diaphragm ring is rotated along with the focusing ring and as a result the diaphragm is automatically opened or closed the required amount.

Thus, by means of the present apparatus, the flash photographer need only perform the following:

(1) Set and lock the camera with a specific guide number visible through window 16 which remains fixed for same combination of illumination film and shutter speed. This is done at the time the camera is being loaded with the particular film.

(2) Focuses, preferably using range finder.

(3) Takes picture.

This simple procedure is in marked contrast with the normal sequence of operations, using a conventional prior art camera, in which (with the assistance of a chart provided by the manufacturer of his illuminating means on which the guide number, and shutter speed and type of film, correlated)—the photographer proceeds as follows:

(1) Selects a flash lamp and a specific film.

(2) With selected film chosen he decides on shutter speed (experience).

(3) Knowing the shutter speed, film type and illumination to be used he determines the guide number by reference to the chart.

(4) Sets shutter speed manually.

(5) Employss rangefinder or estimates distance to subject.

(6) Takes distance and divides into guide number to get $f$ value.

(7) Sets $f$ value on camera.

(8) Focuses on subject.

(9) Takes photograph (if subject and conditions have not changed radically during the interval required for the several operations recited above).

(c) Manual

The third manner in which the camera may be operated is as a wholly manually operated camera, wherein the photographer is free to adjust the focus, diaphragm opening the shutter speed in accordance with his experience. For example, there will be instances where the photographer notes that the background and the subject to be photographed are in sharp contrast or "out of balance" photographically. The operator will recognize that the diaphragm adjustment provided by the automatic operation of the photocell and means associated therewith must be changed to produce a good picture of the desired subject. By the present invention, means are provided for adjusting the exposure manually without disconnecting or deenergizing the photocell and in a simple and a direct manner.

If convenient, for example, for nearby subjects not likely to move rapidly out of reach, the operator may use the camera as an exposure meter by bringing it close to the subject and reading the exposure scale setting in the view finder. In this manner the influence of the background on the photocell is avoided. On returning to the proper picture taking location, the operator sights the camera on the subject and by the manual adjustment he increases or decreases the exposure to the value he has just determined to be suitable for the subject being photographed. For simplicity the same diaphragm actuating pin is used to actuate the diaphragm, but its movement is now controlled by the mechanical means which over-rides the actuating impulse derived from the light sensitive cell.

As the camera is moved to other subjects, the manual adjustment, superimposed on the automatic adjustment may be removed by returning the camera to a fully light sensitive controlled condition.

In the present camera, uniform increments of angular motion of the diaphragm adjusting ring cause the lens diaphragm to be opened or closed in accordance with a uniform $f$ scale, that is, between each unit of the $f$ scale the same amount of angular motion of the diaphragm adjusting ring is necessary to change the diaphragm opening one unit of the $f$ scale, whether this be one or more full units or corresponding equal fractions thereof. Uniform increments of angular motion cause the lens diaphragm to change in accordance with a uniform $f$ value scale i.e.: $f/2.8$, 4, 5.6, etc. The same value increment of angular motion causes the lens to be focused in accordance with a scale based on the square root of twice the square of the distance.

Having now described our invention in accordance with the patent statutes, we claim:

A photographic camera adapted to take pictures of artificially or naturally illuminated subjects which includes; means for focusing the camera and for automatically and simultaneously adjusting the diaphragm to maintain a uniform exposure, as the camera is focused on the subject, said means comprising a focus ring, a cam carried on said ring and plotted as a function of the square root of twice the square of the distance to the subject; a diaphragm ring oriented with reference to the focus ring; a diaphragm cam plotted as a similar function of the distance to the subject; means for detachably connecting said focus ring and said diaphragm ring, so that adjustment of one produces a corresponding adjustment of the other when they are operatively connected and adjustment of one produces no adjustment of the other when they are not operatively connected; said connecting means comprising an elongated retractible pin, secured to a rearwardly extending portion of said diaphragm ring, disposed parallel to the optical axis of said camera, said pin being movable selectively into and out of a plurality of operating positions as follows: a first position in which the forward extremity of said pin is fixedly disposed in any of a plurality of cooperating recesses in said focus ring, whereby the relative orientation of said focus ring and said diaphragm ring relative to one another is determined and remains fixed for flash-bulb operation; a second position in which said pin is retracted rearwardly to permit said focus ring and said diaphragm control ring to move freely and independently of one another under manual urging by the photographer; and a third position in which said pin is disengaged from said cooperating recesses in said focus ring, in an unretracted position, for operation with the diaphragm controlled by a photocell operatively connected thereto.

References Cited in the file of this patent

UNITED STATES PATENTS

| | | |
|---|---|---|
| 2,179,851 | Hineline | Nov. 14, 1939 |
| 2,193,325 | Riszdorfer | Mar. 12, 1940 |
| 2,341,387 | Riddell | Feb. 8, 1944 |
| 2,351,834 | Phillips | June 20, 1944 |
| 2,384,552 | Kaprelian | Sept. 11, 1945 |
| 2,465,578 | Czarnikow et al. | Mar. 29, 1949 |
| 2,549,230 | Parody | Apr. 17, 1951 |
| 2,841,064 | Bagby et al. | July 1, 1958 |

FOREIGN PATENTS

| | | |
|---|---|---|
| 786,184 | Great Britain | Nov. 13, 1957 |